(No Model.)
F. F. RAYMOND, 2d.
PROCESS OF ATTACHING HEELS.
No. 343,728. Patented June 15, 1886.
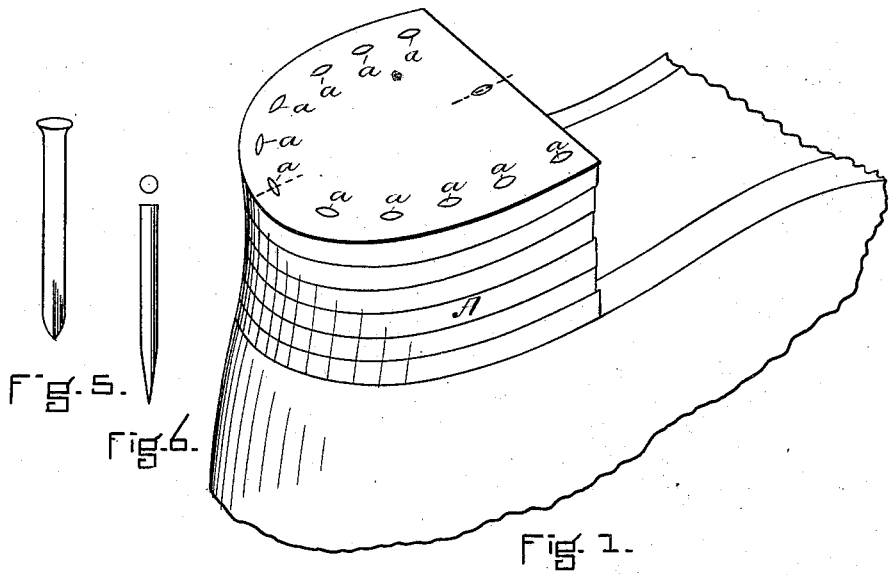
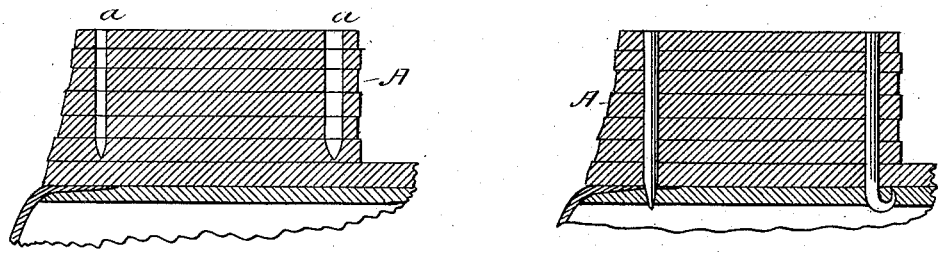
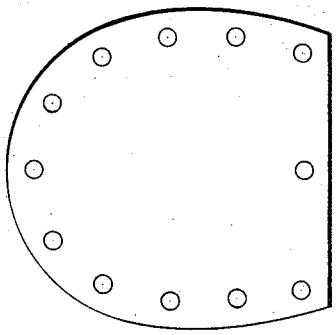
WITNESSES
INVENTOR

UNITED STATES PATENT OFFICE.

FREEBORN F. RAYMOND, 2D, OF NEWTON, MASSACHUSETTS.

PROCESS OF ATTACHING HEELS.

SPECIFICATION forming part of Letters Patent No. 343,728, dated June 15, 1886.

Application filed August 14, 1885. Serial No. 174,362. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in the Process of Attaching Boot or Shoe Heels, of which the following is a full, clear, and exact description, reference being had to the accompanying drawings, forming a part of this specification, in explaining its nature.

My invention relates to the process or method of attaching heels to boots or shoes, consisting, first, in forming in the heel-blank elongated holes for the reception of the attaching-nails; second, in attaching said heel-blank to the soles of the boot or shoe by a gang or group of cylindrical unheaded fastenings of a size to completely fill the previously-formed holes; and, third, in compressing said heel-blank either while said fastenings are being driven or subsequently.

Referring to the drawings, Figure 1 represents in perspective a pricked heel. Fig. 2 is a vertical section which shows the awl-holes upon the dotted lines of Fig. 1. Figs. 3 and 4 show the change in shape of the awl-holes upon the driving of the nails. Fig. 5 is an elevation of the awl, and Fig. 6 an elevation and plan of the nail.

In practicing my method I take the heel-blank A and form therein, either before it is placed in the attaching-machine or after, as may be desired, a series of holes, *a*, made by awls having points or ends substantially like those represented in section in Fig. 5, and adapted to form elongated holes—that is, holes which are longer than they are wide—and the shape of these holes is well represented in Figs. 1 and 2. The heel having thus been provided with holes of this character is then attached to the soles of the boot or shoe by means of a gang or group of unheaded nails, preferably simultaneously driven, and these nails have round or cylindrical shanks of uniform size extending from their points to their upper ends, and which form from three-quarters to five-sixths or more of the length of the nails before they are driven. The points of these nails preferably are formed by the two bevel-surfaces, as represented in the drawings, and so as to clinch upon being forced into contact with the clinching-surface. These nails preferably are made of wire, and their size is such that upon entering the oblong or elongated holes formed by the awls they spread the holes, fill them, and change their shape, and this change in the shape of the holes caused by the introduction of the large round shanks of the nails causes the leather to tightly hug the shanks of the nails and to hold them in place by a very tight binding action, which is increased by the compression to which the heel is subjected either upon the driving of the nails or immediately after it.

I prefer to use in driving the attaching-nails and applying the compression the machine known as the "National Machine," described in Patent No. 316,894, dated April 28, 1885, or a machine having substantially its characteristics, although, of course, I may use any other heel-attaching machine adapted to drive the form of attaching-nails above described, and to compress the heel-blank during the attaching operation or subsequently.

This method of attaching the heels enables me to use a nail superior in quality to that now commonly employed, and provides a very strong and durable construction, and also permits the use of an unheaded nail having a shank of the same form and diameter throughout, as the nails are so tightly held or embraced that they cannot be forced upward through the insole by wear, but are prevented from so doing because so firmly held by the leather and because the nails, being so held and also being circular, head or burr upon their ends as the heel is worn.

The nails which I use in this process are provided with a point only sufficiently long to enable them to be driven well and to clinch upon the inner surface of the insole upon contact with the metal surface of the last or work support, and the remainder of the nails from the point to the upper end are of the same size throughout, and when driven they extend entirely through the heel-blank into the soles of the boot or shoe.

I am aware that it is not new to form oblong or elongated holes in heel-blanks, and to drive unpointed wedge-shaped cut nails, square or rectangular, in cross-section therein under pressure; but I consider that this method of attaching heels does not contain the essential features of my invention because square or rectangular nails cannot fill elongated holes so as to obtain the binding action therein that is obtained by using round nails; also, because such nails, being tapering or wedge-shaped, cannot exert a continuous binding action throughout the length of the heel; also, because such nails, being square or rectangular, do not self head or burr as a nail circular in cross-section does; also, because I am enabled by this process to make and use nails of wire having a uniform diameter from their points to their head ends.

Having thus fully described my invention, I claim and desire to secure by Letters Patent of the United States—

The method of attaching heels to boots or shoes, consisting in simultaneously forming in the heels elongated holes of less width than the diameter of the nails to be driven therein, and in simultaneously driving into said holes a gang or group of unheaded pointed nails having round shanks of the same size or diameter from their points to their upper ends in upsetting their points and subjecting the heel-blanks to compression either at the time the fastenings are driven or subsequently, all substantially as and for the purposes set forth.

FREEBORN F. RAYMOND, 2D.

In presence of—
FRED. B. DOLAN,
E. A. PHALEN.